(12) United States Patent　(10) Patent No.: US 6,354,165 B1
Schnitzer et al.　(45) Date of Patent: Mar. 12, 2002

(54) AUTOMATED CHANGE-SPEED GEAR BOX

(75) Inventors: Detlef Schnitzer, Denkendorf; Michael Schultheiss, Plochingen; Carsten Schupp, Filderstadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/478,464

(22) Filed: Jan. 6, 2000

(30)　　Foreign Application Priority Data

Jan. 14, 1999　(DE) ......................................... 199 01 067

(51) Int. Cl.$^7$ ................................................. F16H 3/08
(52) U.S. Cl. ........................... 74/333; 74/335; 74/336 R
(58) Field of Search .......................... 74/333, 334, 339, 74/355, 352, 356

(56)　　References Cited

U.S. PATENT DOCUMENTS

| 3,741,358 | A | * | 6/1973 | Magnier | .................... | 192/53 F |
| 4,023,443 | A | | 5/1977 | Usui et al. | ..................... | 74/866 |
| 4,225,024 | A | * | 9/1980 | Kuzma | ..................... | 192/53 F |
| 4,889,003 | A | * | 12/1989 | Rietsch | ......................... | 74/339 |
| 5,179,869 | A | * | 1/1993 | Reynolds | ................... | 74/473 R |
| 5,433,125 | A | * | 7/1995 | Muller | ......................... | 74/477 |

FOREIGN PATENT DOCUMENTS

| DE | 880 855 | 6/1953 |
| DE | 2361474 | 6/1974 |
| DE | 3021489 | 12/1981 |
| DE | 19726380 | 11/1998 |
| JP | 3208944 | * | 9/1983 |

* cited by examiner

Primary Examiner—Sherry Estremsky
Assistant Examiner—Tisha D. Lewis
(74) Attorney, Agent, or Firm—Kenyon & Kenyon

(57) ABSTRACT

An automated change speed gearbox is provided. The gearbox includes at least two shafts arranged parallel to one another, in which fixed gears are arranged in an axially nondisplaceable and rotationally fixed manner coaxially with the first shaft, these fixed gears meshing at least indirectly with free gears which are arranged in an axially nondisplaceable but rotatable manner coaxially with the second shaft, both an annular sliding sleeve and a frictional-torque transmission device being arranged, likewise coaxially with the second shaft, between the first free gear and the second free gear arranged next to the latter, this annular sliding sleeve being displaceable axially in the direction of the first free gear by means of an actuator to establish a rotationally fixed and positive connection between the first free gear and the second shaft, whereas the frictional-torque transmission device can be displaced axially in the direction of the second free gear to transmit a frictional torque from the second shaft to the second free gear. To provide a simple and low-cost change-speed gearbox which allows rapid engagement of a gear, the invention envisages that the annular sliding sleeve should have internal teeth which engage in external teeth arranged concentrically and in a rotationally fixed and axially nondisplaceable manner relative to the second shaft, and in that the frictional-torque transmission device can be displaced by means of the annular sliding sleeve.

16 Claims, 2 Drawing Sheets

AUTOMATED CHANGE-SPEED GEAR BOX

CROSS REFERENCE TO RELATED APPLICATION

Priority is claimed with respect to German Application No. 199 01 067.6-14 filed in Germany of Jan. 14, 1999, the disclosure of which is incorporated herein by reference.

BACKGROUND OF THE INVENTION

1. Technical Field

The invention relates to an automated change-speed gearbox. More particularly, the invention relates to an apparatus for establishing a rotationally fixed and positive connection between a plurality of gears and a shaft.

2. Discussion

The prior art (DE 30 21 489 A1) has disclosed an automated change-speed gearbox of the same generic type in which two free gears are arranged coaxially with one another on an output-drive shaft. A sliding sleeve is arranged between the two free gears in such a way that it can be displaced axially both onto the first and onto the second free gear. This allows the respective free gear to be connected positively and in a rotationally fixed manner to the output-drive shaft. In addition, there is a tapered friction ring arranged in a rotationally fixed but axially displaceable manner on the output-drive shaft, this tapered friction ring thus allowing only a frictional connection to be established between one free gear and the output-drive shaft.

In this arrangement, the sliding sleeve is displaced by means of a first actuator, while the tapered friction ring is displaced by means of a second actuator.

One disadvantage of this change-speed gearbox is that the use of a separate actuator for the tapered friction ring is relatively expensive.

SUMMARY OF THE INVENTION

It is the object of the invention to provide a simple and low-cost automated change-speed gearbox which allows rapid engagement of a gear.

One advantage of the automated change-speed gearbox according to the invention is that a separate actuator for a frictional-torque transmission device is eliminated. The same actuator displaces a sliding sleeve both in one direction onto a first free gear to establish a positive connection and in the opposite direction onto a second free gear to brake or accelerate a first shaft against a second shaft by means of the frictional-torque transmission device. In this arrangement, both the sliding sleeve and the frictional-torque transmission device are advantageously supported against the same external teeth arranged in a rotationally fixed manner on the second shaft. This brings with it advantages in terms of costs and machining compared with separate support arrangements for the sliding sleeve, on the one hand, and the frictional-torque transmission device, on the other.

Another objective of the present invention is to provide an advantageous embodiment of the frictional-torque transmission device as a tapered friction ring. The operating force required for frictional engagement is reduced compared with that in other frictional-torque transmission devices, such as multi-plate clutches. The reason for this is the multiplication of the force due to the angle of taper included between the friction faces and the axis of the shaft.

An additional objective of the present invention is to provide a change speed gearbox having a particularly short axial length. By virtue of the fact that the profile of the second free gear has a I shape, the tapered friction ring can be arranged axially within a space enclosed by the second free gear.

A further objective of the present invention is to provide a simple and low-cost way of advantageously enabling a different material to be chosen for the tapered friction ring from that for the sliding sleeve.

A yet further objective of the present invention allows the use of thin tapered friction rings, which advantageously require relatively little axial installation space. However, these thin tapered friction rings are also more sensitive to jerky engagement of the frictional-torque transmission device than wide tapered friction rings. The frictional-torque transmission device is engaged less jerkily if the engagement force is increased progressively with time.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which from an intergal part of the specification, are to be read in conjunction therewith, and like reference numerals are employed to designate identical components in various views.

DETAILED DESCRIPTION OF THE DRAWINGS

An apparatus and method for coupling a plurality of free gears to a shaft within a change speed gearbox is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
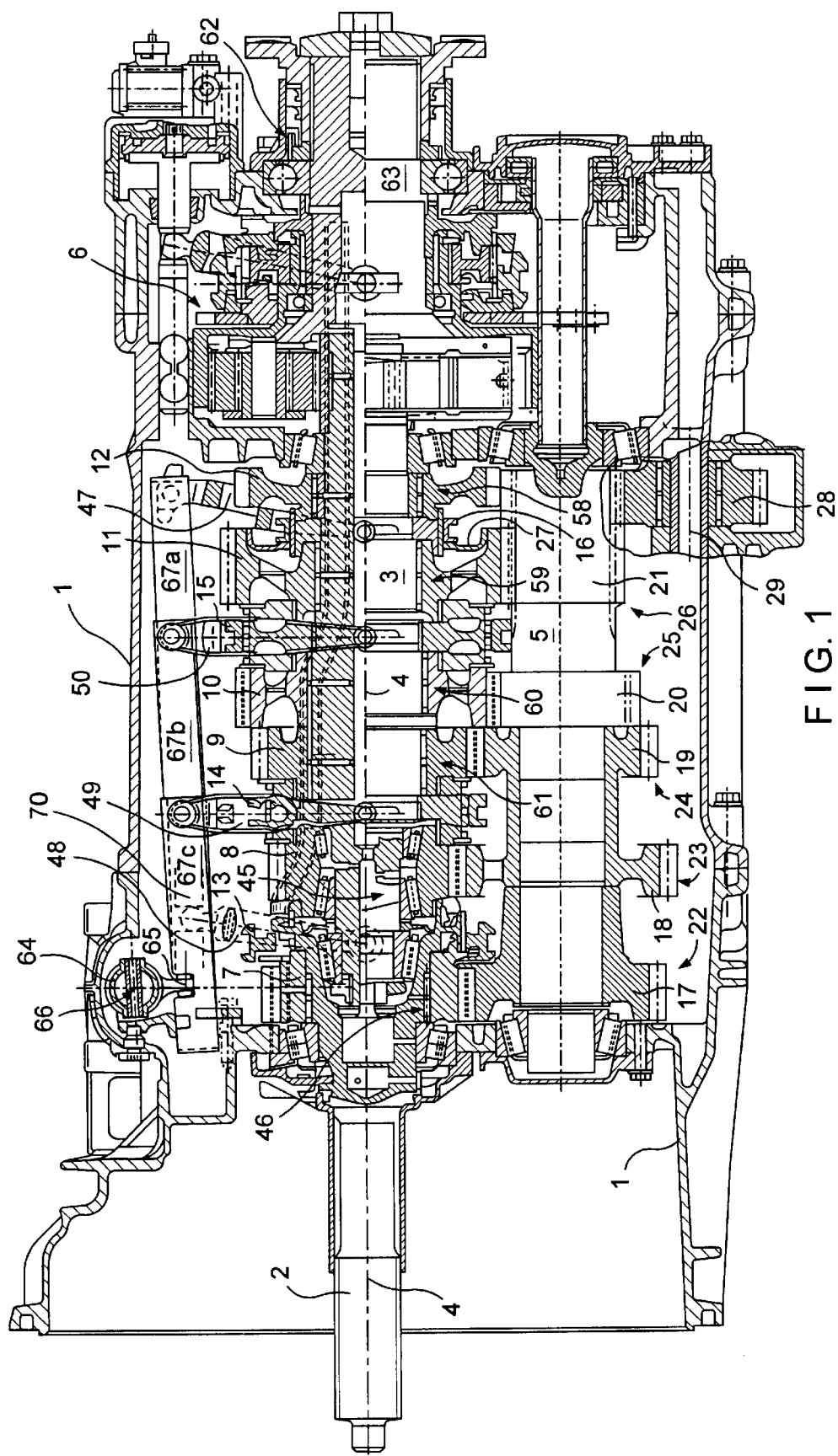
FIG. 1 shows an automated change-speed gearbox according to the invention, in which an axially displaceable tapered friction ring is arranged on an output-drive shaft between a first free gear and a reverse-gear wheel

FIG. 1 shows an automated change-speed motor-vehicle gearbox according to the invention which is arranged in the power transmission path between an engine (not shown specifically) and the driven vehicle wheels, a clutch (not shown specifically) being arranged between the engine and the change-speed gearbox. A torque is transmitted from the engine to an input-drive shaft 2 of the change-speed gearbox, the said shaft being arranged together with an output-drive shaft 3 of the change-speed gearbox on a common geometrical axis 4. A layshaft 5 is arranged parallel to the geometrical axis 4. The input-drive shaft 2 the output-drive shaft 3 and the layshaft 5 are mounted rotatably in a gearbox casing 1 of the change-speed gearbox. The output-drive shaft 3 immediately adjoins a range group 6 in the power transmission path. The rotational speed of an output shaft 63 of the range group 6 is detected by means of a rotational-speed sensor 62. A range sensor detects the instantaneously selected gear stage of the range group 6. A control device (not shown specifically) is connected both to the rotational-speed sensor 62 and to the range sensor and can thus determine the rotational speed at the output-drive shaft 3.

Among the components controlled by the control device (not shown specifically) are a gate cylinder (not shown specifically), a gear-ratio cylinder and a splitter cylinder. The gate cylinder and the gear-ratio cylinder are both coupled to a selector tube 64 arranged vertically and offset above the geometrical axis 4. Here, engagement and disengagement movements of the gate cylinder lead to axial movements of the selector tube 64 along a longitudinal axis 66 of the selector tube, whereas disengagement and engagement movements of the gear-ratio cylinder lead to swivelling movements of the selector tube 64 about its longitudinal axis 66. The selector tube 64 is in one piece with a selector finger 65, one end of which is guided in selector grooves of selector rails 67a, 67b, 67c. The selector rails 67a, 67b, 67c are coupled kinematically in such a way, by selector rockers 47, 49, 50, to sliding sleeves 14, 15, 16 arranged coaxially with the geometrical axis 4 that axial movements of the selector tube 64 necessarily lead to the selection of one of the sliding sleeves 14, 15, 16 and rotary movements of the selector tube 65 necessarily lead to axial movements of one of the sliding sleeves 14, 15, 16 along the axis 4.

The splitter cylinder has a piston rod 70 which is coupled in such a way, by a selector rocker 48, to a sliding sleeve 13 that axial movements of the piston rod 70 necessarily lead to axial movements of the sliding sleeve 13 along the axis 4.

The direction towards the range group 6 is referred to below as the right, whereas the axially opposite direction is referred to as the left. No further details of the range group 6 will be given below.

Arranged coaxially with the geometrical axis 4 in axially nondisplaceable fashion are six free gears, these comprising a reverse-gear wheel 12, a first free gear 11, a second free gear 10, a third free gear 9, a first constant gear 7 and a second constant gear 8. The two constant gears 7, 8 are mounted rotatably relative to the axis 4, a first bearing arrangement 46 being arranged radially between the first constant gear 7 and the input-drive shaft 2 and a second bearing arrangement 45 being arranged radially between the second constant gear 8 and the output-drive shaft 3. Either the first constant gear 7 or the second constant gear 8 can be connected in a rotationally fixed manner to the input-drive shaft 2 by means of the first sliding sleeve 13. The reverse-gear wheel 12, the first free gear 11, the second free gear 10 and the third free gear 9 are mounted rotatably relative to the output-drive shaft, respective bearing arrangements 58, 59, 60, 61 being arranged radially between these free gears and the output-drive shaft 3. The reverse-gear wheel 12, the first free gear 11, the second free gear 10, the third free gear 9 and indeed also the second constant gear 8 can each be coupled in a rotationally fixed manner to the output-drive shaft 3 by means of one of three sliding sleeves 14, 15, 16.

The layshaft 5 is connected in a rotationally fixed manner to five fixed gears, which are arranged coaxially with this shaft and comprise a first fixed gear 17, a second fixed gear 18, a third fixed gear 19, a fourth fixed gear 20 and a fifth fixed gear 21. The first fixed gear 17 and the second fixed gear 18 each mesh with a respective constant gear 7 and 8, allowing power to be transmitted from the input-drive shaft 2 to the layshaft 5 via the constant gear 7 or 8 respectively connected in a rotationally fixed manner to the said input-drive shaft. In this arrangement, the first constant gear 7 forms a first gear pair 22 with the first fixed gear 17, and the second constant gear 8 forms a second gear pair 23 with the second fixed gear 18.

The third fixed gear 19, the fourth fixed gear 20 and the fifth fixed gear 21 of the layshaft 5 mesh directly with the three free gears 9, 10, 11 arranged on the output-drive shaft 3. The following gear pairs 24, 25, 26 are here formed and by means of these pairs power can be transmitted from the layshaft 5 to the output-drive shaft 3.

The third fixed gear 19 forms a third gear pair 24 with the third free gear 9.

The fourth fixed gear 20 forms a fourth gear pair 25 with the second free gear 10.

The fifth fixed gear 21 forms a fifth gear pair 26 with the first free gear 11.

The fifth fixed gear 21 is furthermore in constant mesh with an intermediate gear 28 which, in turn, meshes with the reverse-gear wheel 12. Intermediate gear 28 is here arranged on an engineering axis 29 arranged parallel to the layshaft 5 and to the output-drive shaft 3. For greater clarity, the cutout in which the intermediate gear 28 is situated is shown offset in parallel.

The annular sliding sleeve 16 and an annular tapered friction ring 27 are arranged between the reverse-gear wheel 12 and the first free gear 11 coaxially with the geometrical axis 4.

The rotational speed of the second free gear 10 is measured by a further rotational-speed sensor (not shown specifically) arranged on the said free gear and is transmitted to the control device. Since the second free gear 10 is in constant mesh with the fourth fixed gear 20 connected in a rotationally fixed manner to the layshaft 25, the control device can determine the rotational speed of the layshaft 5 by means of the transmission ratio of the fourth gear pair 25.

Figure 2:
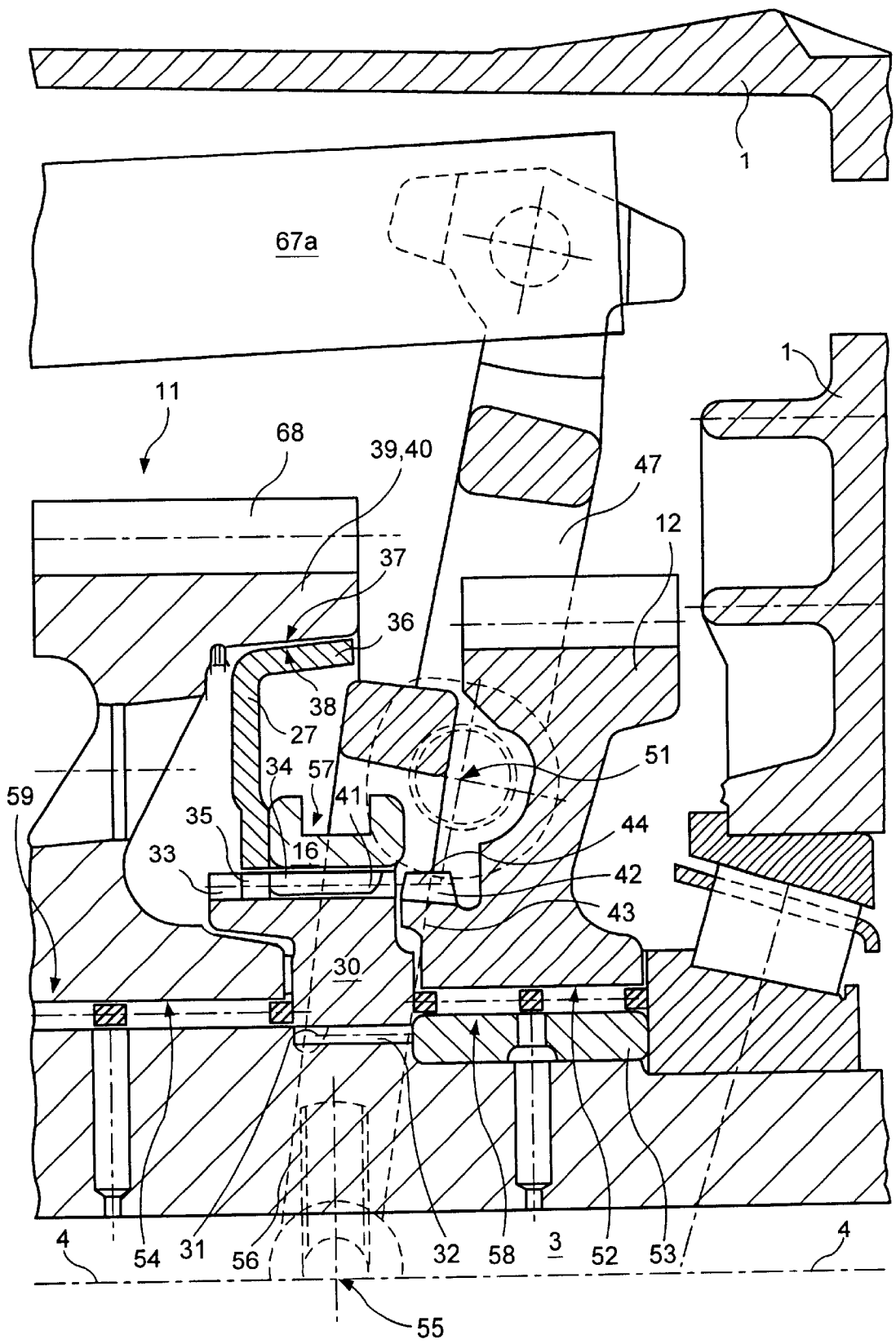
FIG. 2 shows a detail of the automated change-speed gearbox shown in FIG. 1 in the region of the tapered friction ring, the tapered friction ring being in a state of frictional transmission from the output-drive shaft to the first free gear.

FIG. 2 shows a detail of the automated change-speed gearbox in the region of the annular tapered friction ring 27, the latter being shown in a state of friction transmission from the output-drive shaft 3 to the first free gear 11.

Both the first free gear 11 and the reverse-gear gear wheel 12 have an approximately I-shaped profile. In the case of the free gear 11, the upper, horizontal web 39 of the I-shaped profile is formed by a toothed ring 40 which has, on its outer circumference, teeth 68 which mesh with teeth on the fifth fixed gear 21 of the layshaft 5.

The first free gear 11 has a centrally arranged hole 54, while the reverse-gear wheel 12 has a centrally arranged hole 52. Hole 54 accommodates bearing arrangement 59, by means of which the first free gear 11 is mounted directly, rotatably and in an axially nondisplaceable manner relative to the output-drive shaft 3. Hole 52 accommodates bearing arrangement 58, by means of which the reverse-gear wheel 12 is mounted indirectly via a bearing inner race 53, rotatably and in an axially nondisplaceable manner relative to the output-drive shaft 3 by means of. Arranged axially between the reverse-gear wheel 12 and the first free gear 11, coaxially with the output-drive shaft 3 is an annular sliding-sleeve carrier 30, arranged on the inside of which are teeth 31 which form a rotationally fixed connection with teeth 32 arranged on the outer circumference of the output-drive shaft 3. The sliding-sleeve carrier 30 is supported against axial displacement by the reverse-gear wheel 12, on the one hand, and by the first free gear 11, on the other. Arranged on the outer circumference of the sliding-sleeve carrier 30 are external teeth 33 in which internal teeth 34 on the annular sliding sleeve 16 and internal teeth 35 on the annular tapered friction ring 27 engage. As a result, the sliding sleeve 16 and the tapered friction ring 27 are axially displaceable but rotationally fixed relative to the sliding-sleeve carrier 30 and hence also are arranged in such a way as to be axially displaceable and rotationally fixed relative to the output-drive shaft 3. In this arrangement, the tapered friction ring 27 is arranged to the left of the sliding sleeve 16, in a space 69 formed on the side of the first free gear 11 facing the reverse-gear wheel 12 by virtue of the I-shaped profile of the said free gear 11 and lying radially to the inside of the toothed ring 40. Radially on the outside, the tapered friction ring 27 has an annular rim 36, which is arranged at an angle of taper to the axis 4. On its outer circumference, the annular rim 36 has the likewise tapered external friction face 37. This external friction face 37 is arranged parallel to an internal friction face 38 arranged on the inside of the toothed ring 40 of the free gear 11.

On the left-hand side of the reverse-gear wheel 12, the latter has a concentrically arranged annular projection 43. Arranged on the outer circumference of this projection 43 are external teeth 42 which correspond to external teeth 33 on the sliding-sleeve carrier 30. The mutually facing axial ends 41, 44 of the external teeth 42 on the projection 43 and of the internal teeth 34 on the sliding sleeve 16 are of claw-shaped design.

The selector rocker 47 can be pivoted about a pivoting axis 51 and, approximately in a horizontal plane in which the axis 4 lies, has sliding blocks 56 which are mounted so as to be rotatable about an axis 55 and are guided in a circumferential groove 57 in the sliding sleeve 16. When the selector rocker 47 is pivoted about the pivoting axis 51, the sliding blocks 56 push the sliding sleeve 16 axially to the left or right, depending on the direction of pivoting.

By means of this selector rocker 47, the sliding sleeve 16 can be displaced axially into a neutral position. In this neutral position, the sliding sleeve 16 is displaced axially to the right in relation to the state shown in FIG. 1 and FIG. 2. During this process, the external teeth 42 on the projection 43 and the internal teeth 34 on the sliding sleeve 16 are not in contact and there is a gap between the tapered external friction face 37 and the internal friction face 38, this gap ideally preventing the transmission of frictional torque.

The two sliding sleeves 14 and 15 likewise each have a neutral position and, in FIG. 1, are shown in the neutral position. When the three sliding sleeves 14, 15, 16 associated with the output-drive shaft 3 are in the neutral position, the change-speed gearbox is likewise in the neutral position.

The operation of the change-speed gearbox will be explained below by way of example for a first case, in which the motor vehicle is stationary, the engine is at an idling speed of, for example, 800 rpm, the clutch is engaged and the control device is receiving a signal to select a gear—here, for example, reverse gear. This first case occurs, for example, after the engine starting procedure and before the motor vehicle is driven away.

Since the first constant gear 7 is in constant mesh with the first fixed gear 17 and the second constant gear 8 is in constant mesh with the second fixed gear 18 and since one of the two constant gears 7, 8 is connected in a rotationally fixed manner to the input-drive shaft 2, the layshaft 5 rotates at a rotational speed which is dependent on the transmission ratio of the first gear pair 22 or the second gear pair 23.

In order to actually engage the reverse gear preselected in the control device in the change-speed gearbox, the driver of the vehicle must disengage the clutch. Once this frictional connection has been disengaged, the layshaft 5 continues to rotate due to its inertia and is braked only by slight frictional losses (bearing friction, churning losses in the gearbox oil). The free gears arranged coaxially with the axis 4 likewise continue to rotate since these mesh directly and indirectly with the fixed gears, which are connected in a rotationally fixed manner to the layshaft 5. When the vehicle is stationary, the rotational speed of the output-drive shaft 3 is zero, as is that of the sliding-sleeve carrier 30, the sliding sleeve 16 and the tapered friction ring 27.

Triggered by the disengagement of the clutch, the control device (not shown specifically) for the selector tube 64 now emits a signal to brake the reverse-gear wheel 12 to a rotational speed that differs little from that of the stationary output-drive shaft 3. A small rotational-speed difference is necessary in order to bring the internal teeth 34 on the sliding sleeve 16 into engagement with the external teeth 42 on the annular projection 43. To brake the reverse-gear wheel 12, the control device controls a disengagement motion of the gate cylinder, and the selector tube 64 is thus displaced axially along the longitudinal axis 66 of the selector tube until the selector finger 65 is in the selector groove of the selector rail 67a. The selector tube 64 is then swivelled about its longitudinal axis 66, whereupon the selector finger 65 displaces the selector rail 67a to the right, with the result that the selector fork 47 is pivoted about the axis 51 and the sliding blocks 56 push the sliding sleeve 16 axially to the left. The tapered friction ring 27 is thereby likewise pushed to the left and, as a result, the external friction face 37 of the tapered friction ring 27 transmits a frictional torque with the internal friction face 38 of the free gear 11 after they come into contact, the said frictional torque braking the layshaft 5 against the stationary output-drive shaft 3. During this process, the contact force is controlled with respect to time and increases progressively with respect to time until the control device detects the rotational-speed difference defined in the latter. This rotational-speed difference allows the subsequent displacement of the sliding sleeve 16 to the right, as a result of which this sliding sleeve enters into positive engagement with the reverse-gear wheel 12 and the sliding-sleeve carrier 30 and output-drive shaft 3. The displacement of the sliding sleeve 16 to the right is here accomplished in a manner similar to its displacement to the left. However, the direction of action of the gear-ratio cylinder (not shown specifically) is reversed. As soon as this positive engagement between the reverse-gear wheel 12 and the output-drive shaft 3 has been established, a sound is emitted to indicate to the driver of the vehicle that he can engage the clutch and drive away in reverse gear.

The mode of operation is analogous for the other gears, the displacement of the sliding sleeve 16 to the right into the neutral position, i.e. the ending of frictional torque transmission, being followed by the axial displacement of the sliding sleeve associated with the respectively selected gear to establish a positive connection.

The operation of the change-speed gearbox will be explained below for a second case, in which the driver of the vehicle initiates a braking operation but does not continue this until the motor vehicle is stationary but puts the change-speed gearbox into neutral and then engages a forward gear to continue driving. This case usually occurs when braking ahead of a red light if the latter changes to amber or green before the motor vehicle comes to a halt.

During this braking operation, the driver of the vehicle usually disengages the clutch. If the change-speed gearbox is then put into neutral by the driver of the vehicle, both the input-drive shaft 2 and the layshaft 5 rotate due to their moments of inertia. While the rotational speed of the output-drive shaft 3 decreases as the rotational speed of the vehicle wheels decreases, the layshaft 5 and the input-drive shaft 2 are braked only by the slight frictional losses (bearing friction, churning losses in the gearbox oil). As a result, the rotational speed of the output-drive shaft 3 decreases more rapidly than the rotational speed of the layshaft 5 and of the input-drive shaft 2. If the braking operation is ended before the motor vehicle comes to a halt and a forward gear is then preselected, then, as in the first case, the layshaft 5 must be braked until a particular difference between the rotational speed of the free gear associated with the preselected forward gear and the rotational speed of the output-drive shaft 3 has been reached. Once this rotational-speed difference has been reached, the free gear associated with the preselected forward gear is connected to the output-drive shaft 3. A sound is then emitted to indicate to the driver of the vehicle that he can engage the clutch to continue driving at the transmission ratio of the forward gear chosen.

The operation of the change-speed gearbox will be explained below by way of example for a third case, in which the clutch is disengaged, the motor vehicle is moving forward due to its inertia, the change-speed gearbox is in neutral and the control device is receiving a signal to indicate that a forward gear should be engaged.

The rotational speed of the output-drive shaft 3 can here be determined from the speed of the motor vehicle, the tyre diameter, the rear-axle transmission ratio and the selected gear stage of the range group 6.

Owing to the fact that the sliding sleeves 14, 15, 16 which can be displaced axially by means of the selector tube 64 are in the neutral position, no torque is transmitted from the rotating output-drive shaft 3 to the layshaft 5. Since the clutch is disengaged, no torque is transmitted to the input-drive shaft 2 or the layshaft 5 from the engine either. Due to the frictional losses, the rotational speed of the layshaft 5 decreases with time, this rotational speed reaching a value of zero given enough time. If the control device now receives a signal indicating that a forward gear should be engaged, the control device emits a signal to accelerate the layshaft 5. For this purpose, as when braking the layshaft 5, the tapered friction ring 27 is displaced axially to the left, with the result that a frictional torque is transmitted between the external friction face 37 of the tapered friction ring and the internal friction face 38 of the free gear 11. The layshaft 5 and the free gear associated with the forward gear to be engaged are accelerated to a rotational speed which corresponds to the difference between the rotational speed of this free gear and that of the output-drive shaft 3. This rotational-speed difference allows the free gear associated with the forward gear to be engaged to be connected positively to the output-drive shaft 3.

The change-speed gearbox is suitable not only for trucks but also especially for other commercial vehicles, such as all-terrain and construction-site vehicles which operate in environments with high tractive resistances, since in the case of these vehicles the rotational speed of the output-drive shaft is reduced relatively rapidly owing to the high tractive resistances.

An automated clutch would be a suitable solution instead of the acoustic signal which indicates to the driver of the vehicle when a gear has been engaged and when therefore the clutch can be engaged.

The friction cone of a change-speed gearbox according to the invention can also be used quite generally for synchronizing purposes—as a central synchronizing device for motor vehicles for example. The layshaft can be braked or accelerated against the output-drive shaft, depending on the transmission ratio of the gear pair on which the friction cone is arranged.

A change-speed gearbox according to the invention does not have to be embodied as a two-stage layshaft gearbox. In further possible configurations, change-speed gearboxes according to the invention may have any number of stages or shafts.

In another configuration of a change-speed gearbox according to the invention, one actuator is assigned exclusively to sliding sleeve 16. The other sliding sleeves 13, 14, 15 are displaced by means of further actuators. The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope of fair meaning of the accompanying claims.

What is claimed is:

1. An automated change-speed gearbox with at least two shafts (3,5) arranged to one another, in which a plurality of fixed gears (17, 18, 19, 20, 21) are arranged in an axially nondisplaceable and rotationally fixed manner coaxially with the first shaft (5), the fixed gears meshing at least indirectly with a plurality of free gears (7, 8, 9, 10, 11, 12) which are arranged in an axially nondisplaceable but rotatable manner coaxially with the second shaft (3), said automated change-speed gearbox comprising:

an annular sliding sleeve (16) disposed coaxially with the second shaft (3) and between the first free gear (12) and the second free gear (11);

a frictional-torque transmission device coaxially arranged with the second shaft (3), between the first free gear (12) and the second free gear (11) disposed adjacent thereto; and an actuator mounted in said gearbox for pivotal movement about a pivot axis;

said annular sliding sleeve (16) being displaceable axially in the direction of the first gear (12) in response to rotation of said actuator in a first direction about the pivot axis to establish a rotationally fixed and positive connection between the first free gear (12) and the second shaft (3), said frictional-torque transmission device being axially displaceable in the direction of the second free gear (11) in response to rotation of said actuator in a second direction about said pivot axis to transmit a frictional torque from the second shaft (3) to the second free gear (11), said annular sliding sleeve (16) includes internal teeth (34) which engage in external teeth (33) arranged concentrically and in a rotationally fixed and axially nondisplaceable manner relative to the second shaft (3), and said frictional-torque transmission device displaceable by the annular sliding sleeve (16).

2. An automated change-speed gearbox according to claim 1, wherein the first shaft (5) is a layshaft and the second shaft (3) is an output-drive shaft arranged coaxially with an input-drive shaft (2).

3. An automated change-speed gearbox according to claim 1, wherein the frictional-torque transmission device comprises a tapered friction ring (27) which has a first tapered friction face (37) arranged parallel to a second friction face (38) arranged on the second free gear (11).

4. An automated change-speed gearbox according to claim 3, wherein the second free gear (11) has an approximately I-shaped profile, thus forming radially on the outside of the second free gear (11) a ring (40), on the inside of which the second friction face (38) is arranged.

5. An automated change-speed gearbox according to claim 3, wherein the tapered friction ring (27) is a separate component from the sliding sleeve (16) and, on the inside, has internal teeth (35) which engage in the external teeth (33).

6. An automated change-speed gearbox according to claim 1, wherein the engagement force due to the axial displacement of the sliding sleeve (16) in the direction of the second free gear (11) can be increased progressively with time.

7. An automated change-speed gearbox having a first shaft and a second shaft arranged generally parallel to one another, the gearbox comprising:
- first and second free gears arranged in an axially nondisplaceable but rotatable manner coaxially with the second shaft;
- an annular sliding sleeve disposed coaxially with the second shaft and between the first and second free gears;
- a frictional-torque transmission device coaxially arranged with the second shaft and disposed between the first and second free gears; and
- an actuator mounted in said gearbox for pivotal movement about a pivot axis;
- said annular sliding sleeve being displaceable axially in the direction of the first free gear in response to rotation of said actuator in a first direction about the pivot axis to establish a rotationally fixed and positive connection between the first free gear and the second shaft, said frictional-torque transmission device being displaceable axially by the annular sliding sleeve in the direction of the second free gear in response to rotation of said actuator in a second direction about said pivot axis for transmitting a frictional torque from the second shaft to the second free gear.

8. The automated change-speed gear box of claim 7, wherein the first shaft is a layshaft and the second shaft is a output-drive shaft arranged coaxially with an input-drive shaft.

9. The automated change-speed gear box of claim 7, wherein the frictional-torque transmission device comprises a tapered friction ring which has a first tapered friction face arranged parallel to a second friction face arranged on the second free gear.

10. The automated change-speed gearbox of claim 7, wherein the second free gear has an approximately I-shaped profile, thus forming radially on the outside of the second free gear a ring, on the inside of which the second friction face is arranged.

11. The automated change-speed gearbox of claim 7, wherein a tapered friction ring is a separate component from the sliding sleeve and, on the inside, has internal teeth which engage the external teeth.

12. The automated change-speed gearbox of claim 7, wherein an engagement force due to the axial displacement of the sliding sleeve in the direction of the second free gear can be increased progressively with time.

13. The automated change-speed gearbox of claim 1, wherein the actuator is a rocker arm pivotal in response to linear movement of a selector rail.

14. The automated change-speed gearbox of claim 1, further comprising at least one sliding block guided in a circumferential groove of the sliding sleeve, the at least one sliding block operative to axially move the sliding sleeve in response to rotation of the actuator.

15. The automated change-speed gearbox of claim 7, wherein the actuator is a rocker arm pivotal in response to linear movement of a selector rail.

16. The automated change-speed gearbox of claim 7, further comprising at least one sliding block guided in a circumferential groove of the sliding sleeve, the at least one sliding block operative to axially move the sliding sleeve in response to rotation of the actuator.

* * * * *